United States Patent

Muller

[11] 3,891,364
[45] June 24, 1975

[54] APPARATUS FOR THE CONTINUOUS VULCANISATION OF ENDLESS BELTS

[75] Inventor: Alexander Muller, Hoxter, Germany

[73] Assignee: Hoxtersche Gummifadenfabrik Emil Arntz K.G., Hoxten, Germany

[22] Filed: July 22, 1974

[21] Appl. No.: 490,496

[30] Foreign Application Priority Data
July 25, 1973   Germany.......................... 2337749

[52] U.S. Cl............. 425/28 B; 425/34 B; 425/373; 425/384
[51] Int. Cl............................ B29h 5/28; B29h 7/22
[58] Field of Search ............................ 425/28 B, 373

[56] References Cited
UNITED STATES PATENTS

| | | |
|---|---|---|
| 1,959,488 | 5/1934 | Meyer .......................... 425/28 B X |
| 2,325,204 | 7/1943 | Kilborn ......................... 425/28 B X |
| 2,327,566 | 8/1943 | Shusher........................... 425/28 B |
| 2,867,845 | 1/1959 | Sauer ............................. 425/28 B |
| 3,477,895 | 11/1969 | Sauer ......................... 425/28 B X |

Primary Examiner—J. Howard Flint, Jr.
Attorney, Agent, or Firm—Mason, Mason & Albright

[57] ABSTRACT

This invention relates to apparatus for the continuous vulcanisation of endless belts, particularly vee-belts. The apparatus has a vulcanising zone with two heatable, parallel, equidirectional and synchronously drivable vulcanising drums therein. The drums each have a helical groove for moving the belt continuously through said zone. Shrinkage in belt strengtheners can be overcome by vulcanising under tractive stress, and this reduces belt elongation during use.

7 Claims, 7 Drawing Figures

APPARATUS FOR THE CONTINUOUS VULCANISATION OF ENDLESS BELTS

This invention relates to apparatus for the continuous vulcanisation of endless belts, particularly vee-belts.

Rotatary drums with belts laid in peripheral grooves, have been proposed hitherto for vulcanising vee-belts, a pressure belt being looped over part of the endless vee-belt, the other parts of the endless belt not contacted by the pressure belt being guided over direction-changing rollers and over a lockable and adjustable clamping drum. The vulcanising process takes place in an arc of contact with the heatable vulcanising drum during a single revolution of the belt being vulcanised.

Where vee-belt strengtheners have shrinkage elasticity under the heat used in vulcanisation, e.g., strengtheners of polyester cord, a further revolution is effected in which stretching of the vee-belt occurs, in a longitudinal direction using the adjustable and lockable clamping drum, in order that minimal elongation of the belt occurs during use. Subsequent cooling in the stretched condition by charging the vulcanising drum with a heating and cooling medium, or by the use of separate apparatus, serves to prevent longitudinal shrinkage. A permanent elongation results from a part of the length of the belts being subjected to a higher temperature during vulcanisation.

It has also been proposed hitherto to effect so-called "normalising" of the vee-belts in apparatus in which, by reheating the belts for example to the vulcanisation temperature, it is possible to reduce permanent elongation during use, by influencing the belt strengthener as a result of stretching and stabilising by cooling.

In hitherto proposed apparatus, vee-belts are vulcanised batch-wise, a definite number of vee-belts being laid on the heated vulcanising drum. After one revolution of the belts, the vee-belts are taken off the drum. This procedure is time-consuming and requires a considerable amount of labour, so that the output from such apparatus is comparatively small.

According to the present invention there is provided apparatus for the continuous vulcanisation of an endless belt, the apparatus having a vulcanising zone with two heatable, parallel, equidirectional and synchronously drivable vulcanising drums therein, the drums each having a helical groove therein, the grooves in the two drums being of the same sense and pitch, for moving the belt continuously through the vulcanising zone.

Each vulcanising drum preferably has an endless pressure belt partially engaged therewith. One pressure belt can simultaneously act as means for driving the associated drum, the drum transmitting the rotary movement through gearing to the adjacent drum. Advantageously, the distance between the centers of the two drums is variable.

In accordance with the invention, vulcanising is effected continuously. The vee-belts are fed to one side of the two vulcanising drums, and they pass continuously through the vulcanising zone, and are discharged at the end of the vulcanising drums. Using apparatus in accordance with the present invention a continuous process can be effected without interruption such as occur in the batch-wise charging of vulcanising drums.

Apparatus in accordance with the invention is particularly preferred for producing identical-length endless vee-belts with strentheners of a material which shrinks slightly from the heat of vulcanisation, the belt blank being vulcanised with a slight tractive stress. In order to reduce belt elongation during use, the vulcanisation zone is followed by a stretching zone which consists of two bodies which apply a pressure loading to the vee-belts. Each pressure body consists of a freely rotatable conical portion and a freely rotatable cylindrical portion adjacent thereto, the conical portion consisting of independent discs. Preferably the thickness of each disc is smaller than the spacing between two adjacent sections of vee-belt. Advantageously, each pressure body is mounted on a pivotable lever which can be operated by a common screw-spindle drive.

In this way, a working cycle can be effected which provides vulcanisation from the commencement of rotation of the belt blank until automatic discharge of the completed product, without intermediate stops. If belt strengtheners with thermoplastic and/or heat-shrinkable-elastic properties are used, a regulable-size extension in the longitudinal direction of the belt, including a length-stabilising phase, can be effected.

Directly associated with the consecutive "vulcanisation" and "stretching with stabilisation" steps for each individual belt, is the advantageous utilisation of heat energy transmitted to the belts from the vulcanisation zone. This is a factor of great importance in stretching in the longitudinal direction of the belt. Furthermore, by virtue of the relatively high longitudinal velocity of the vee-belts, a required temperature level is obtained throughout the length of the belts, such that during stretching in a longitudinal direction, each part of the belt is reliably fed to this secondary treatment, thereby ensuring an even reaction for the entire length of the belt during stabilisation.

The resulting continuous belts after vulcanisation and secondary treatment can be subjected to hitherto proposed jointing procedures to make up endless belt blanks.

One embodiment of the present invention will now be described, by way of example, with reference to the accompanying diagrammatic drawings in which.

The illustrated embodiment has two heatable, parallel, equi-directional and synchronously drivable vulcanising drums 1 and 2, each having a helical groove 3 therein, the grooves in the two drums being of the same sense and pitch. The grooves 3 correspond in cross-section 4 in vulcanising zone *a* to the profile of belt which it is required to produce.

Figure 1:
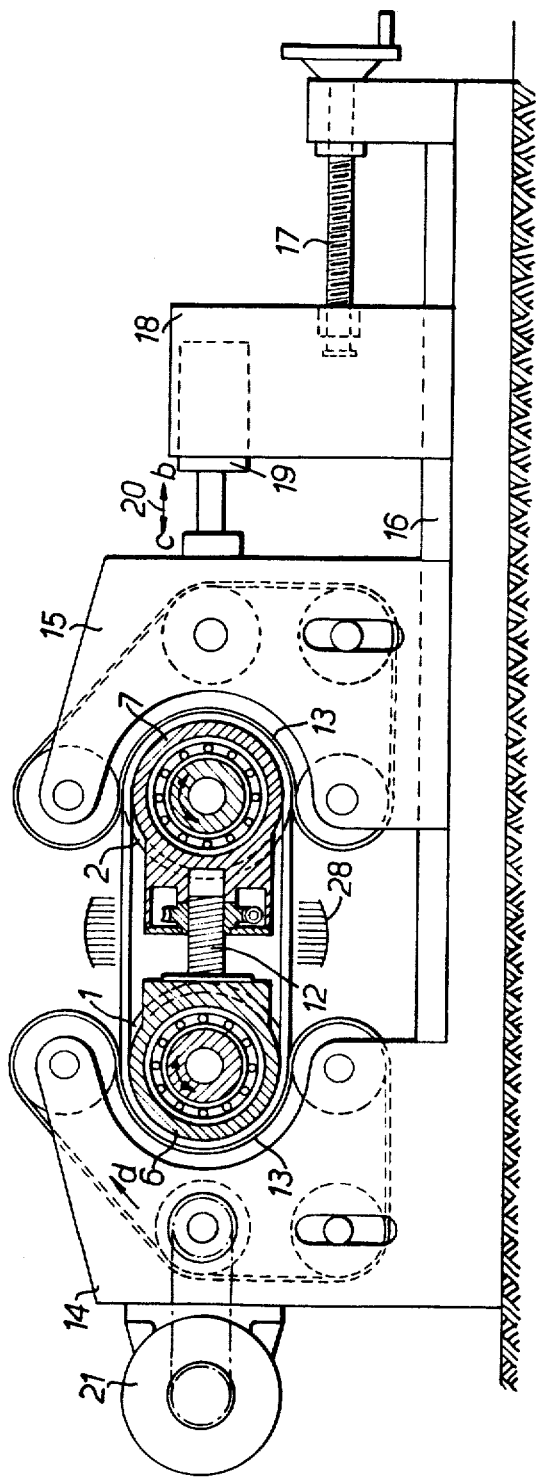
FIG. 1 is a section through the embodiment on line A—A of FIG. 2.
Figure 2:
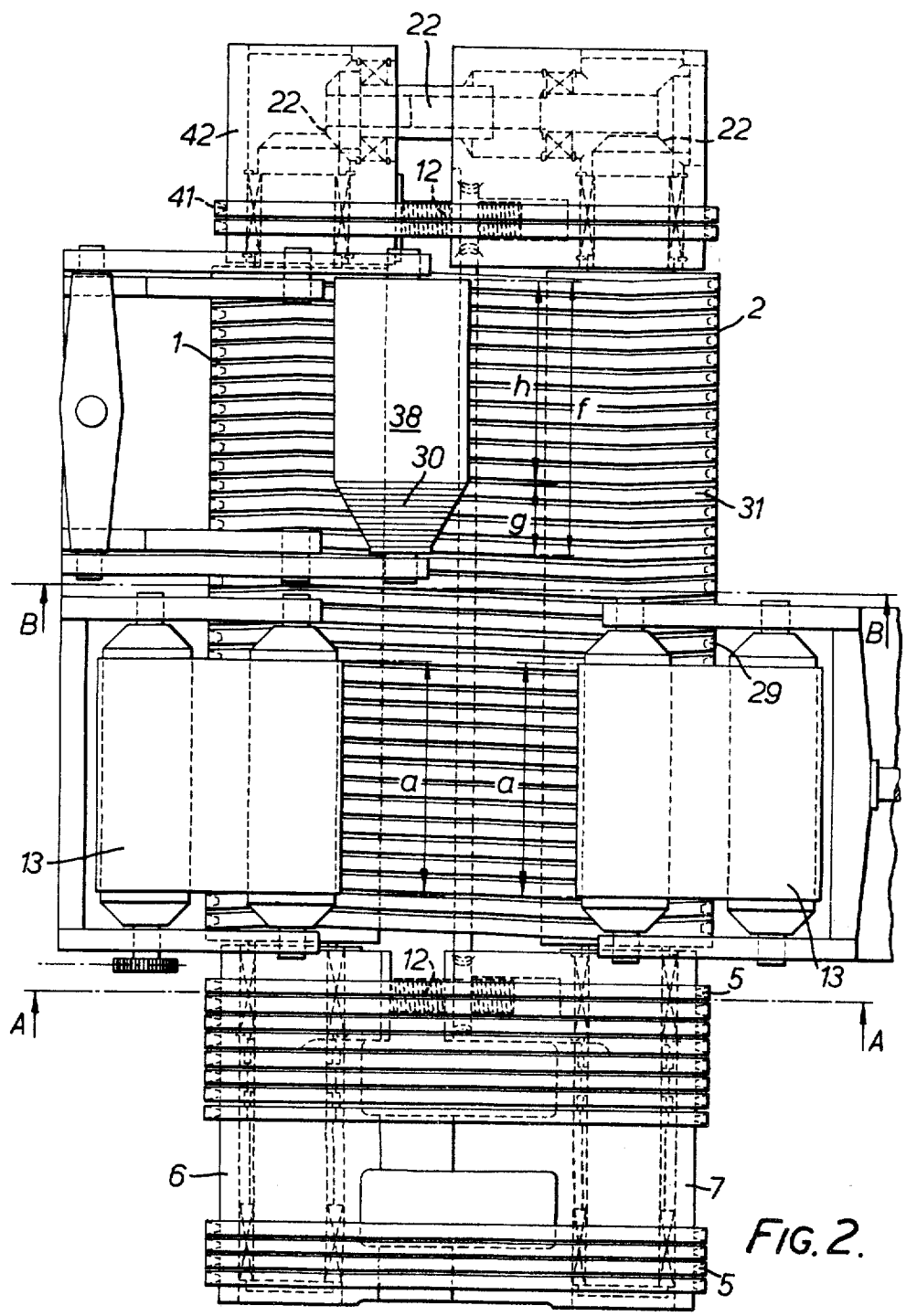
FIG. 2 is a plan view of the embodiment.
Figure 3:
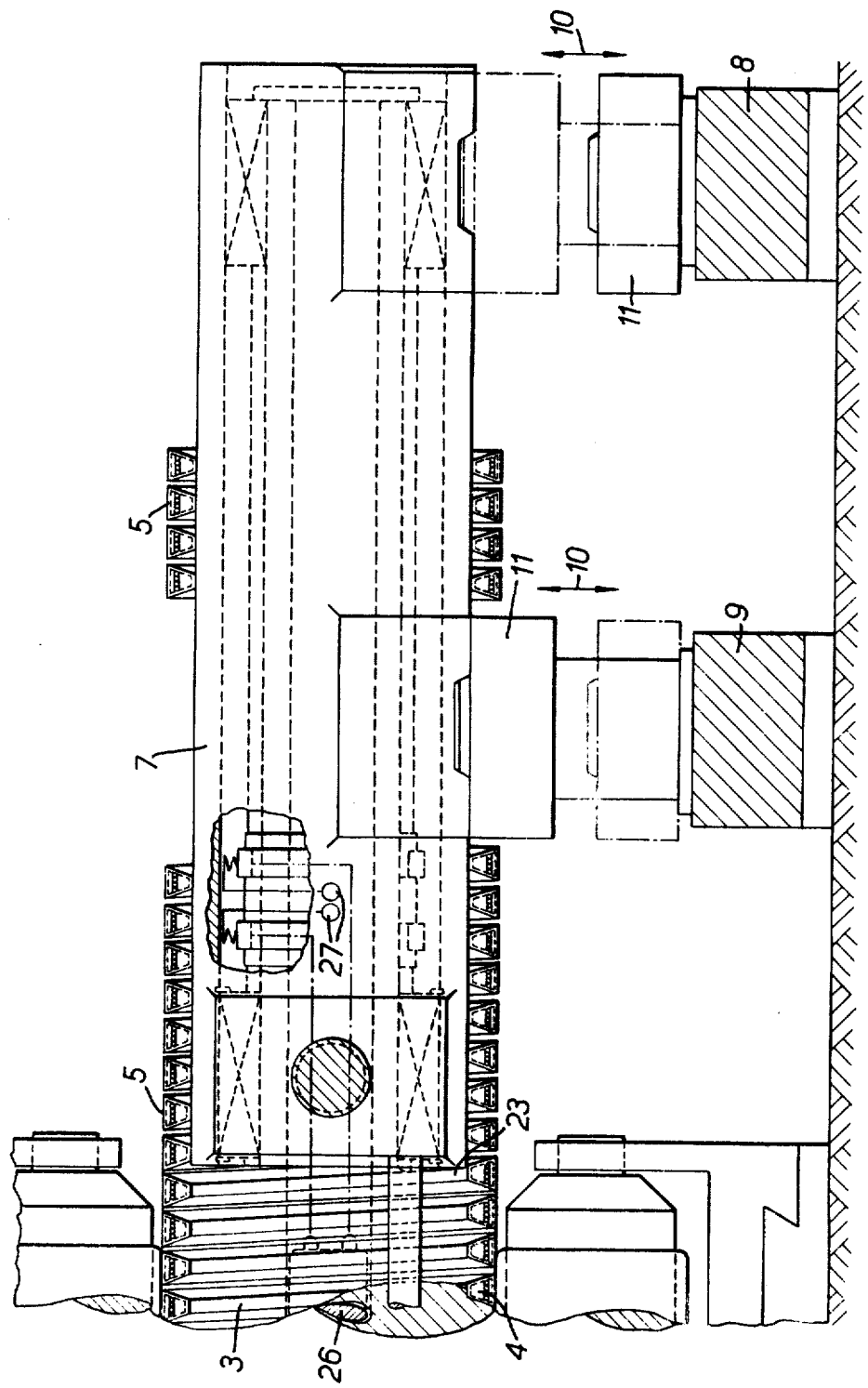
FIG. 3 is a part sectional view of the mounting of a vulcanising drum of the embodiment.
Figure 4:
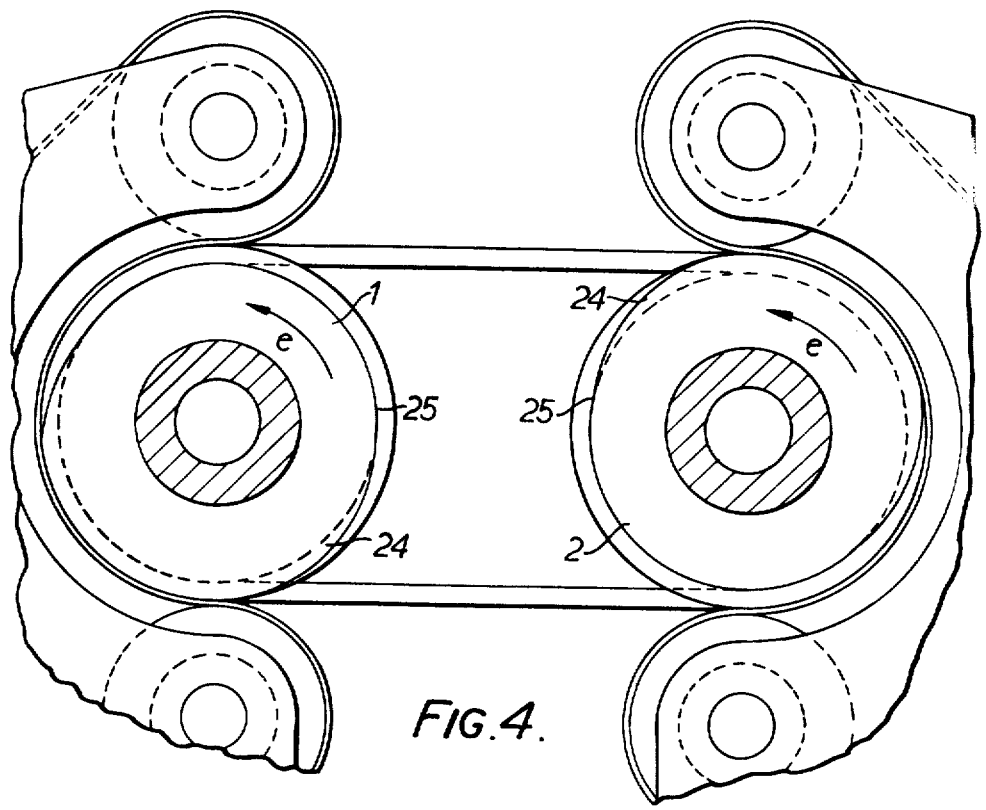
FIG. 4 shows, to an enlarged scale, an end view of a second vulcanising drum of the embodiment.

Endless-belt blanks 5 are fed via bearing blocks 6 and 7 (FIGS. 1, 2 and 3), in which the two vulcanising drums 1 and 2 are rotatably mounted, through supports 8 and 9 having consoles 11 which can be alternately retracted and extended in the directions indicated by the double-headed arrows 10.

Prior to the belt blank 5 being brought to the inlet of the profiled thread 3 of the vulcanising drums 1 and 2, adjustment and support elements 12 are used to adjust the distance between centers of the vulcanising drums 1 and 2 according to the length of the belts to be vulcanised, the bearing block 6 for the vulcanising drum 1 remaining in a stationary position on the consoles 11 while the bearing block 7 for the vulcanising drum 2 assumes its supporting position according to the degree of adjustment. A holding force can thereby be exerted, for example by mechanical and/or electromagnetic elements (not illustrated).

The pressure on the vee-belt blanks 5 inside the vulcanising zone $a$, required for accurate shaping during the vulcanising process, is achieved by endless pressure belts 13 in a fixed frame 14 and a movable frame 15. Frames 14 and 15 are both carried by a common base frame 16 which also serves as a guide and holder for a supporting block 18 with a hydraulic ram 19. Coarse adjustment of the working position of the frame 15 is effected by moving ram 19 with threaded spindle 17.

Coarse adjustment of frame 15 is carried out while the hydraulic ram 19 is retracted in direction $b$ of double-headed arrow 20, so that after pressurised medium is fed to produce movement in the direction $c$, the movable frame 15 brings the pressure belts 13 into a position where they apply pressure in the region of an arc of contact on the vulcanising drums 1 and 2.

Movement $d$ of one pressure belt 13 in frame 14 is achieved by a driving motor 21, the pressure belt 13 producing a rotary movement $e$ of the vulcanising drum 1 by reason of the pressure applied in the arc of contact therewith.

Gearing 22 (FIG. 2) synchronously transmits rotary movement of vulcanising drum 1 to vulcanising drum 2, so that drums 1 and 2 have the same angular velocity and the same sense of rotation, axial movement thereby being parallel in the apparatus.

Figure 5:
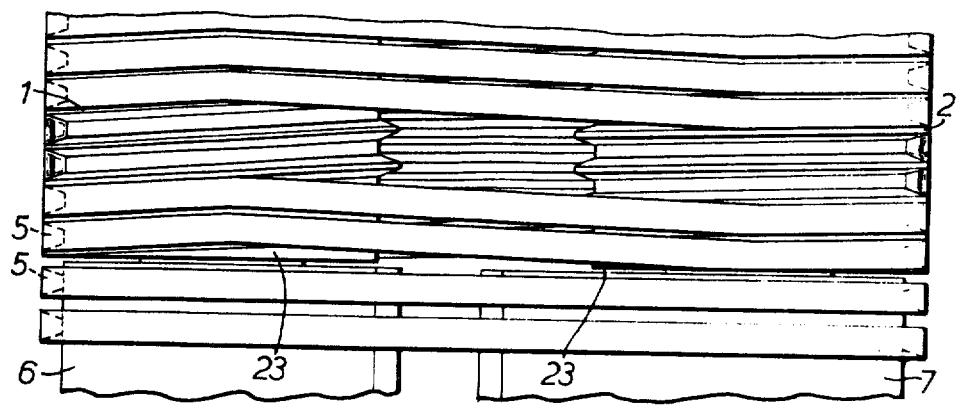
FIG. 5 is a plan view of the drum shown in FIG. 4, some parts not being shown.

Continuous vulcanising commences with the drawing-in of the belt blank 5 into the leading turn 23 (FIGS. 3 and 5) of groove 3 of vulcanising drums 1 and 2, which preferably triggers a feeder arrangement (not illustrated). This process is in synchronism with the rotary movement $e$ of the vulcanising drum 1 and 2, and it is initiated during the period when web segments 24 start to run through the arc of rotation on the intake side of the profiled region between the approximately straight portions of belt blank 5 which is to be drawn in. The differing geometrical location of the belt in the grooves 3 of the vulcanising drum 1 and 2 is allowed for by 160° offset angles, as illustrated by points of transition 25 between segments 24 in the vulcanising drums 1 and 2. According to the rotary movement of the vulcanising drums 1 and 2 the leading turn 23 is free to draw in a further section of belt blank after each complete revolution. After an initial running period, the working zone of the apparatus, with vulcanisation zone $a$ and secondary treatment one $f$, is completely filled. Thereafter, continuous operation with a constant feed of belt blank 5 and discharge of completed belt can be carried out without intermediate stops.

Vulcanisation in vulcanising zone $a$ is effected with electrically operated heating elements 26 (FIG. 3), which are fed with current and controlled through cable 27. Cable 27 extends between the bearing blocks 6 and 7. Alternatively, cables and cable-connecting plugs (not shown) can be used and supplied from an external power source through cavities in supports 8 and 9. In addition, radiant heaters 28 are directed towards the straight portions of the belt 5.

In order to stretch the belts in a longitudinal direction, completely vulcanised belt 29 at the transition between vulcanising zone $a$ and secondary treatment zone $f$ can be guided with relatively little force over pressure-applying bodies while being subjected to vulcanising heat. This can be effected when the belt has strengtheners with thermoplastic and/or heat-shrinking-elastic properties, for example by stretching by 0.1 to 3% of the belt length. Stabilisation of the stretched belts 31 is then effected as a secondary treatment.

Each pressure-applying body consists of a freely rotatable conical portion 30 and a freely rotatable cylindrical portion 38 adjacent thereto. The conical portion 30 consists of a plurality of adjacent, kinematically independent discs 30a.

Figure 6:
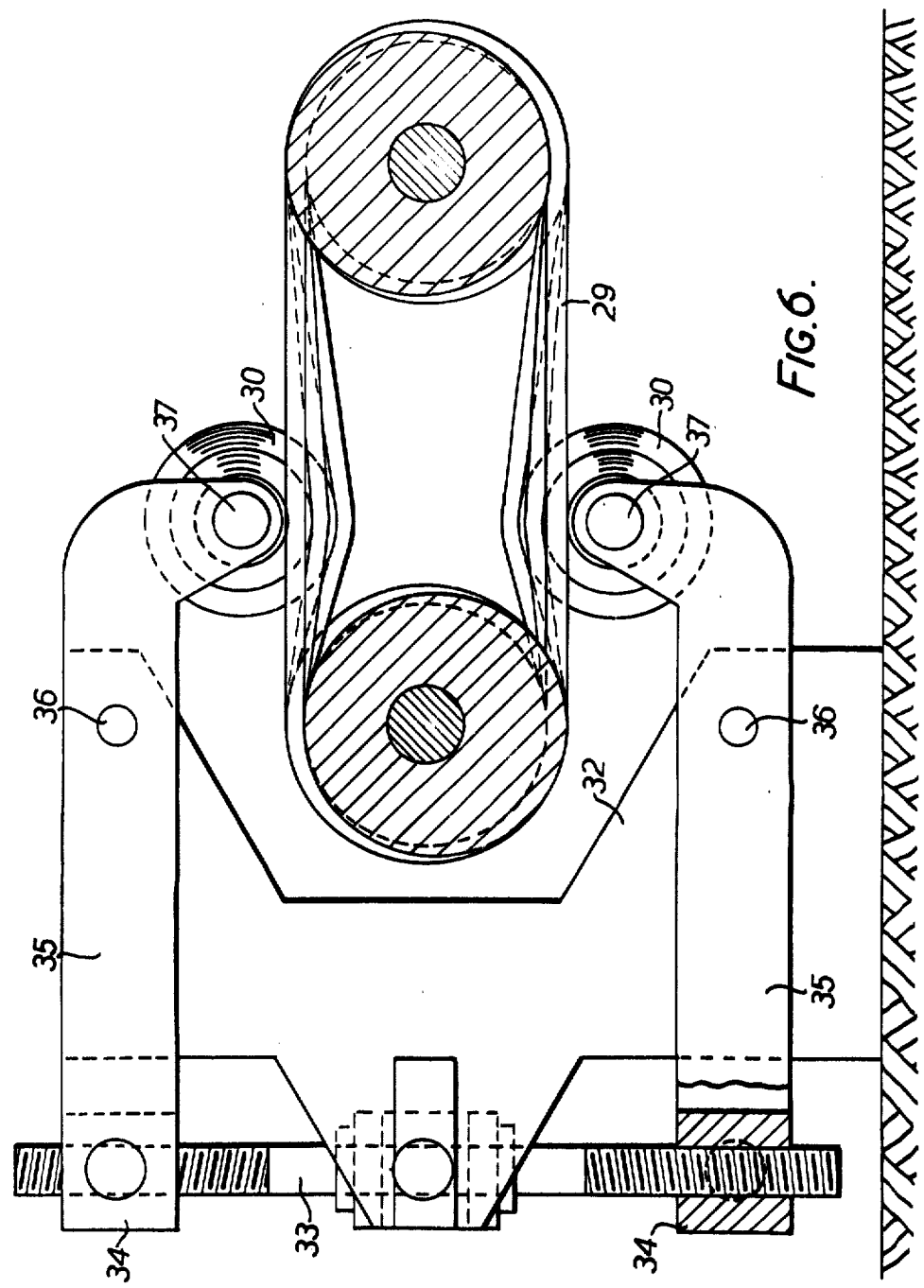
FIG. 6 is a part sectional view on line B—B of FIG. 2, to an enlarged scale.
Figure 7:
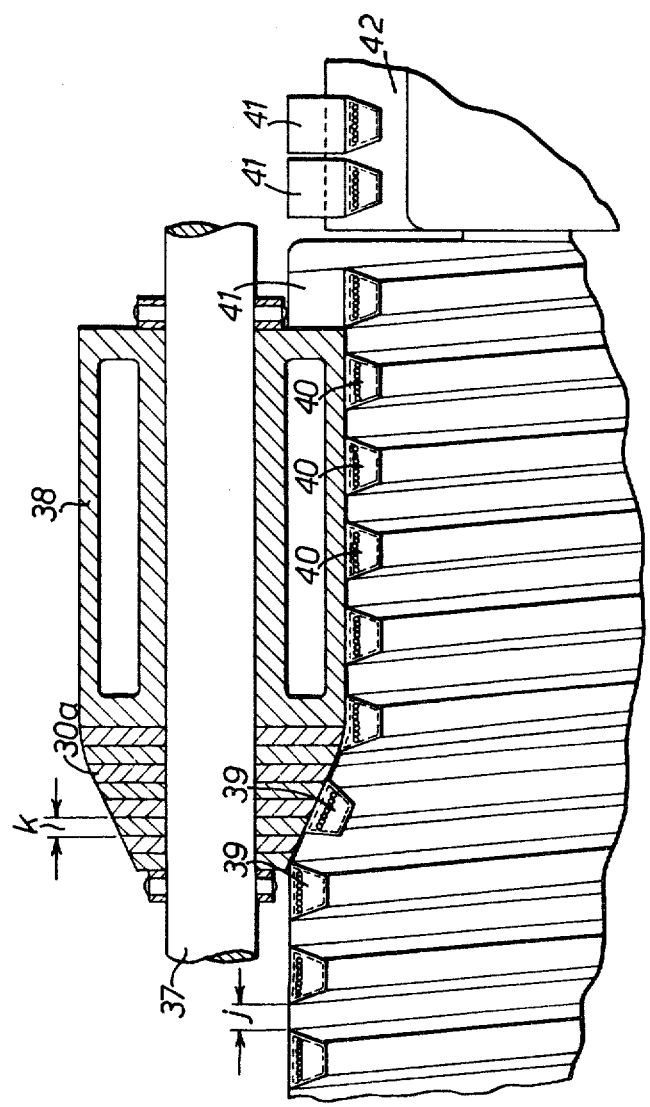
FIG. 7 is a longitudinal section through a pressure-applying body in a stretching zone of the embodiment.

When a secondary treatment of the ready-vulcanised vee-belts 29 (FIG. 6) is effected, the apparatus includes a stationary carrying frame 32, a double threaded spindle 33, universal joint nuts 34, and pivot levers 35 with hinge pins 36. The belts 29 extend around the two vulcanising drums 1 and 2, and due to axial movement in regions outside the drums 1 and 2, and having to pass around the cylindrical roller 38, the discs 30a are automatically guided by the pivot levers 35 and hinge pins 37. The magnitude of the resultant stretch is determined by the variable setting of the pressure-applying bodies. Due to identical speeds of revolution of all the belt sections, the thickness $k$ of each disc 30a of the conical part 30 of the pressure-applying body is smaller than the spacing $j$ between adjacent belts 29 in the region of the stretching zone $g$. This avoids friction due to differential tensioning which might be exerted by the belts 29 in contact with the conical portion 30 at the same point in time Stabilising zone $h$ is traversed by belt 40 in a stretched condition. In order to effect rapid cooling and better fixing of length, a cooling air blower or other cooling means (not shown) is allowed to act on belt 40. After leaving the secondary treatment zone $f$, the belt 41 is automatically conveyed from the system of two vulcanising drums 1 and 2 as a finished product. Belt 41 is then deposited on the housing 42 of the gearing 22.

I claim:

1. Apparatus for the continuous vulcanisation of an endless belt, the apparatus having a vulcanising zone, and two heatable, parallel, equidirectional and synchronously drivable vulcanising drums therein, the drums each having a helical groove therein, the grooves in the two drums being of the same sense and pitch, and arranged to move the belt continuously through the vulcanising zone.

2. Apparatus according to claim 1, wherein each vulcanising drum has an endless pressure belt partially looped therearound and in engagement therewith.

3. Apparatus according to claim 2, having gearing interconnecting said drums, and one pressure belt is arranged to drive one vulcanising drum directly, the resulting rotary movement being transmitted through said gearing to the other vulcanising drum.

4. Apparatus according to claim 1, having a stretching zone, two pressure bodies in said zone for loading the vulcanised belt, each said pressure body consisting of a freely rotatable conical portion and a freely rotatable cylindrical portion adjacent thereto, the conical portion consisting of independent, adjacent and freely rotatable discs.

5. Apparatus according to claim 1, wherein the distance between the centers of the two vulcanising drums is variable.

6. Apparatus according to claim 4, wherein the thickness of each disc is less than the distance between two adjacent turns of the grooves in the vulcanising drum.

7. Apparatus according to claim 4, having a pivotable lever with one of said pressure bodies thereon, the levers being movable through a common screw-spindle drive.

\* \* \* \* \*